(12) United States Patent
Dunbar, Jr.

(10) Patent No.: US 7,334,409 B2
(45) Date of Patent: Feb. 26, 2008

(54) RETRACTABLE AFTERBURNER FOR JET ENGINE

(75) Inventor: Donal S. Dunbar, Jr., Wichita Falls, TX (US)

(73) Assignee: Alltech, Inc., Shertz, TX (US)

( * ) Notice: Subject to any disclaimer, the term of this patent is extended or adjusted under 35 U.S.C. 154(b) by 283 days.

(21) Appl. No.: 10/848,986

(22) Filed: May 19, 2004

(65) Prior Publication Data

US 2005/0257528 A1 Nov. 24, 2005

(51) Int. Cl.
F02K 3/10 (2006.01)
(52) U.S. Cl. ..................................... 60/761
(58) Field of Classification Search ............... 60/226.1, 60/257, 761, 762, 766, 770, 262; 239/265.17, 239/265.11
See application file for complete search history.

(56) References Cited

U.S. PATENT DOCUMENTS

| | | | | |
|---|---|---|---|---|
| 2,887,845 A * | 5/1959 | Hagen | ...................... | 60/39.826 |
| 2,920,843 A * | 1/1960 | Ferri | ........................... | 244/15 |
| 2,929,203 A * | 3/1960 | Henning, Jr. et al. | ........ | 60/762 |
| 3,048,376 A * | 8/1962 | Howald et al. | .............. | 366/262 |
| 3,153,324 A * | 10/1964 | Meyer | ........................ | 60/770 |
| 3,712,062 A * | 1/1973 | Nash | ............................ | 60/766 |
| 3,871,174 A * | 3/1975 | Buisson et al. | ............... | 60/762 |
| 4,064,692 A * | 12/1977 | Johnson et al. | ............... | 60/762 |
| 4,068,471 A * | 1/1978 | Simmons | ...................... | 60/262 |
| 4,069,661 A * | 1/1978 | Rundell et al. | ................ | 60/204 |
| 4,095,420 A * | 6/1978 | Abernethy et al. | ............ | 60/204 |
| 4,551,971 A * | 11/1985 | Suzuki | ........................ | 60/39.53 |
| 4,557,106 A * | 12/1985 | Ffowcs Williams et al. | ........................ | 60/39.281 |
| 4,720,971 A * | 1/1988 | DuBell | ........................ | 60/204 |
| 5,020,318 A * | 6/1991 | Vdoviak | ...................... | 60/226.1 |
| 5,070,690 A * | 12/1991 | Mayer | ........................ | 60/762 |
| 5,076,062 A * | 12/1991 | Abreu | ........................ | 60/749 |
| 5,233,828 A * | 8/1993 | Napoli | ........................ | 60/766 |
| 5,287,697 A * | 2/1994 | Johnson et al. | ............ | 60/226.3 |
| 5,291,672 A * | 3/1994 | Brown | ........................ | 60/262 |
| 5,297,391 A * | 3/1994 | Roche | ........................ | 60/740 |
| 5,367,874 A * | 11/1994 | Auffret et al. | ................ | 60/766 |
| 5,617,717 A * | 4/1997 | Asquith et al. | ............... | 60/761 |
| 5,778,658 A * | 7/1998 | Lamando, Jr. et al. | ........ | 60/204 |
| 5,806,303 A * | 9/1998 | Johnson | ........................ | 60/262 |
| 5,809,772 A * | 9/1998 | Giffin, III et al. | ......... | 60/226.1 |
| 5,867,980 A * | 2/1999 | Bartos | ........................ | 60/226.3 |
| 5,927,067 A * | 7/1999 | Hanloser et al. | .............. | 60/761 |
| 6,038,852 A * | 3/2000 | Celi | ............................ | 60/761 |
| 6,112,513 A * | 9/2000 | Catt et al. | ..................... | 60/204 |
| 6,195,983 B1 * | 3/2001 | Wadia et al. | .............. | 60/226.1 |

* cited by examiner

Primary Examiner—William H. Rodríguez
(74) Attorney, Agent, or Firm—Michael Diaz (57) ABSTRACT

The present invention is a retractable afterburner shroud for use upon a jet engine. The retractable shroud conforms to an outer surface of a jet engine. The afterburner shroud is affixed by a plurality of moveable support arms. The afterburner shroud is retractable. During operation of the afterburner shroud, the afterburner shroud is extended rearward toward the exhaust of the jet engine. A storage tank provides liquid oxygen through the support arms to a mixing ring located within the afterburner shroud. The mixing ring mixes the liquid oxygen and fuel to form a combustible mixture. The combustible mixture is injected into the exhaust wherein the mixture is ignited. The ignited mixture provides additional thrust for the jet engine.

18 Claims, 9 Drawing Sheets

FIG. 11

RETRACTABLE AFTERBURNER FOR JET ENGINE

BACKGROUND OF THE INVENTION

1. Field of the Invention

This invention relates to propulsion systems. Specifically, the present invention relates to an afterburner for use on a jet engine.

2. Description of the Related Art

Figure 1:
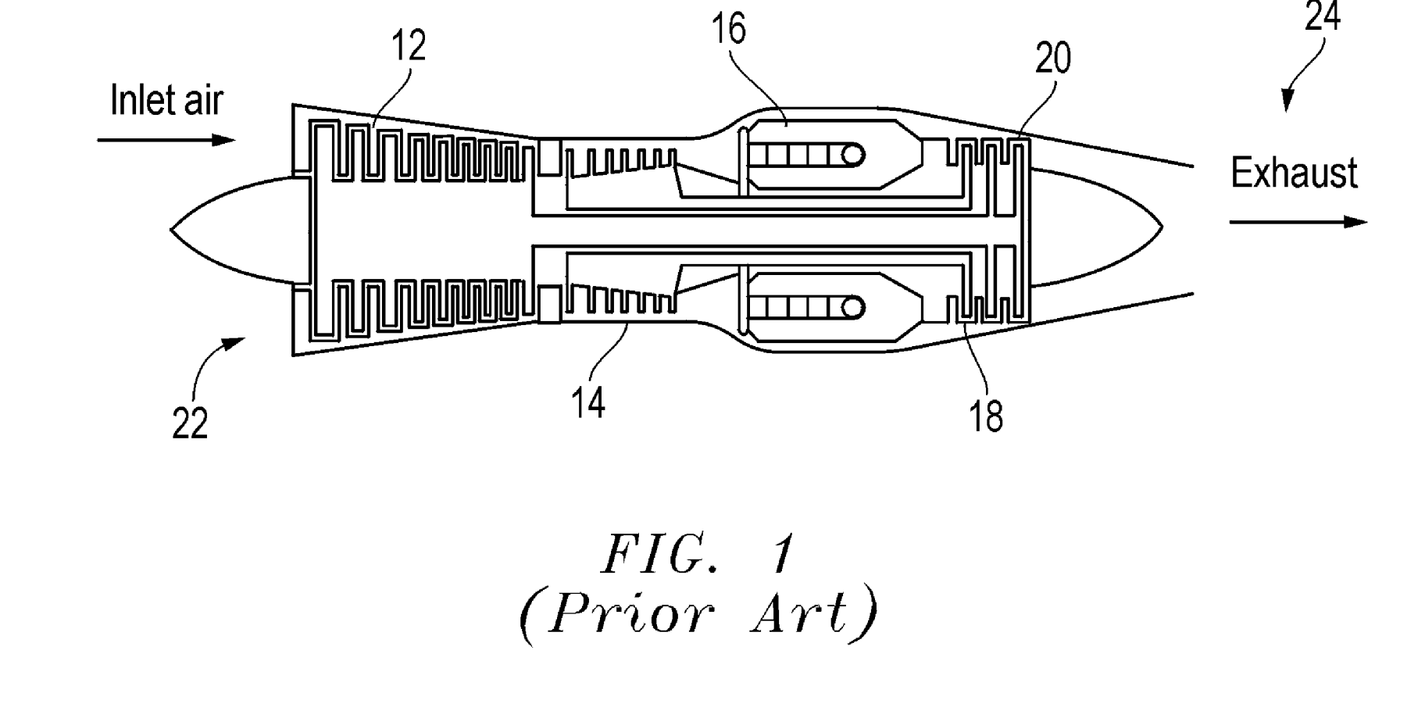
FIG. 1 (Prior Art) illustrates a simplified schematic drawing of a conventional turbojet engine.

Tremendous advances have been made within the first century of aviation. One of the most important advances is the jet engine. Currently, jet engines fall into two broad categories, turbojet and turbofan systems. FIG. 1 illustrates a simplified schematic drawing of a conventional turbojet engine 10. The turbojet engine includes a low pressure compressor 12, a high pressure compressor 14, a combustor 16, a high pressure turbine 18, and a low pressure turbine 20. In the turbojet engine, air comes through an inlet 22 and passes through each component of the engine. The compressor raises the pressure of the inlet air. The pressure ratio varies for different engines, but may approach 30 to 1. The high pressure air enters the combustor where fuel is injected. The fuel-air mixture is ignited and the resulting hot gases pass though the turbines, which in turn, drive the compressors. The air is exhausted through an exhaust 24 and provides the thrust that propels the aircraft. FIG. 1 illustrates a typical twin-spool engine. In addition, the low pressure compressor is driven by the low pressure turbine and the high pressure compressor is driven by the high pressure turbine. These two units rotate at different speeds in order to maintain high efficiency in all stages of compression.

Figure 2:
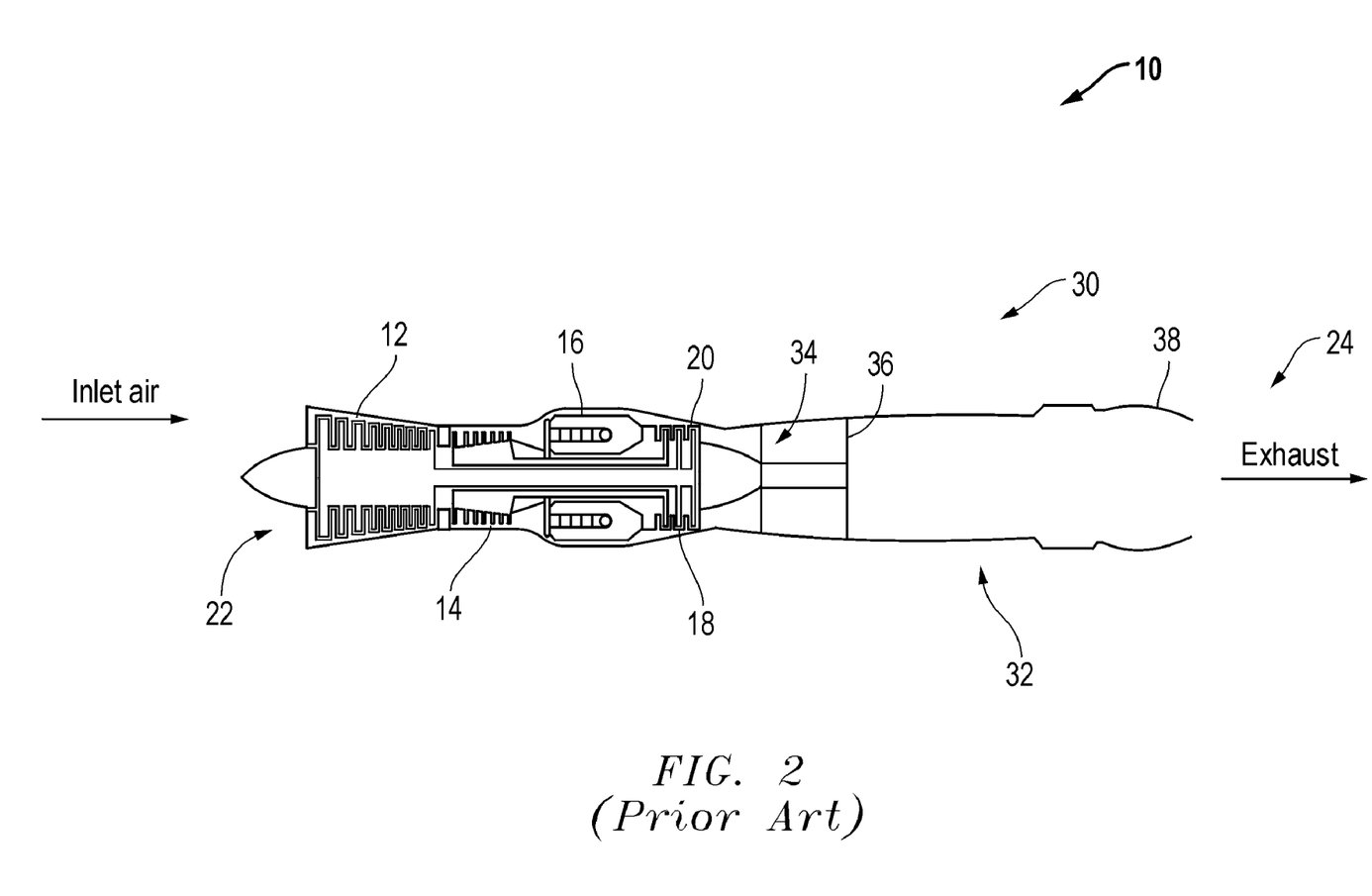
FIG. 2 (Prior Art) illustrates a simplified schematic of a turbojet engine having an afterburner component.

Although the turbojet engine 10 provides significant thrust to propel an aircraft, many aircraft, such as military jet fighters, require large, short time increases in thrust. For example, during takeoff, climb, acceleration, and air combat maneuvers, increased thrust is critical to the utility and safe performance of the aircraft. Quite often an afterburner component is utilized. The afterburner injects additional fuel directly into the engine exhaust and burns in the tail pipe. FIG. 2 illustrates a simplified schematic of a turbojet engine 10 having an afterburner component 30. The afterburner component includes an afterburner duct 32 housing a plurality of axially aligned fuel spray bars 34, a plurality of axially aligned flame holders 36, and an adjustable nozzle 38. Fuel is injected into the exhaust of the rotating part of the engine by the fuel spray bars, and the flame holders stabilizes the flame and prevents the flame from being blown out the exhaust section of the turbojet engine. To obtain maximum thrust from the engine in afterburning and non-afterburning operation, the adjustable nozzle is utilized. The nozzle varies in size and shape to maximize the performance at all flight and engine-operating conditions. Thrust increases of approximately 50 to 80 percent are achievable by use of afterburners on modern jet engines.

Figure 3:
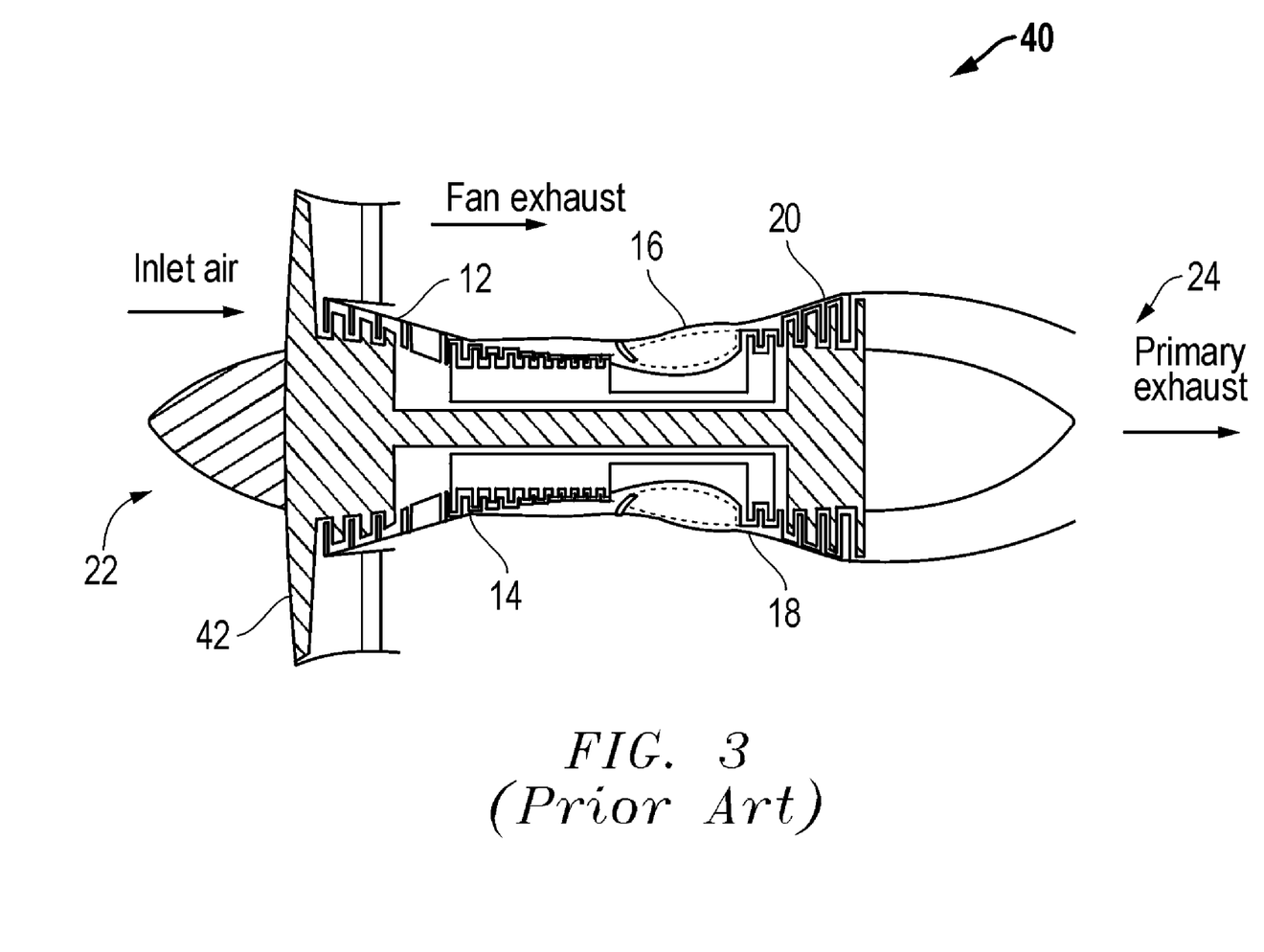
FIG. 3 (Prior Art) illustrates a simplified schematic drawing of a conventional turbofan engine.

FIG. 3 illustrates a simplified schematic drawing of a conventional turbofan engine 40. The turbofan engine contains many of the same components as the turbojet engine 10, such as the low pressure compressor 12, the high pressure compressor 14, the combustor 16, the high pressure turbine 18, the low pressure turbine 20, an inlet 22 and an exhaust 24. However, the turbofan engine utilizes hot jet exhaust extracted by a turbine to drive a fan 42. A portion of the inlet air that enters the fan is bypassed around the engine. The fan, thus, functions in a somewhat similar fashion to a propeller being driven by the turbo-machinery. However, unlike the propeller, a single fan stage may contain from 20 to 50 blades and is typically surrounded by a shroud and actually operates much like a single-stage compressor rather than a propeller. For example, the pressure ratio across a single fan stage is typically in the range of 1.4 to 1.6 while the pressure ratio across the propeller discs of the Lockheed Super Constellation in cruising flight is somewhat less than 1.02.

The bypass ratio of a turbofan engine is defined as the ratio of the mass of air that passes through the fan, but not the gas generator, to that which does pass through the gas generator. The larger the bypass ratio, the greater the amount of energy extracted from the hot exhaust of the gas generator, by as much as 75 percent of the total thrust of a turbofan engine may be attributed to the fan.

Most modern civil and military aircraft are powered by some form of turbofan engines because such engines consume far less fuel to produce a given amount of useful power than do comparable turbojet engines. The higher efficiency of the turbofan engine can be explained with the use of Newton's second law of motion. From this law, it may be deduced that a given level of thrust can be produced at a given flight velocity, either by the addition of a small increment of velocity to a large mass flow of air or by the addition of a large increment of velocity to a small mass flow of air. The required energy addition (i.e., fuel), however, is less for the first than for the second case. The improved efficiency of the turbofan engine as compared with the turbojet is, therefore, directly related to the larger air-flow capacity of the fan engine at a given thrust level.

Figure 4:
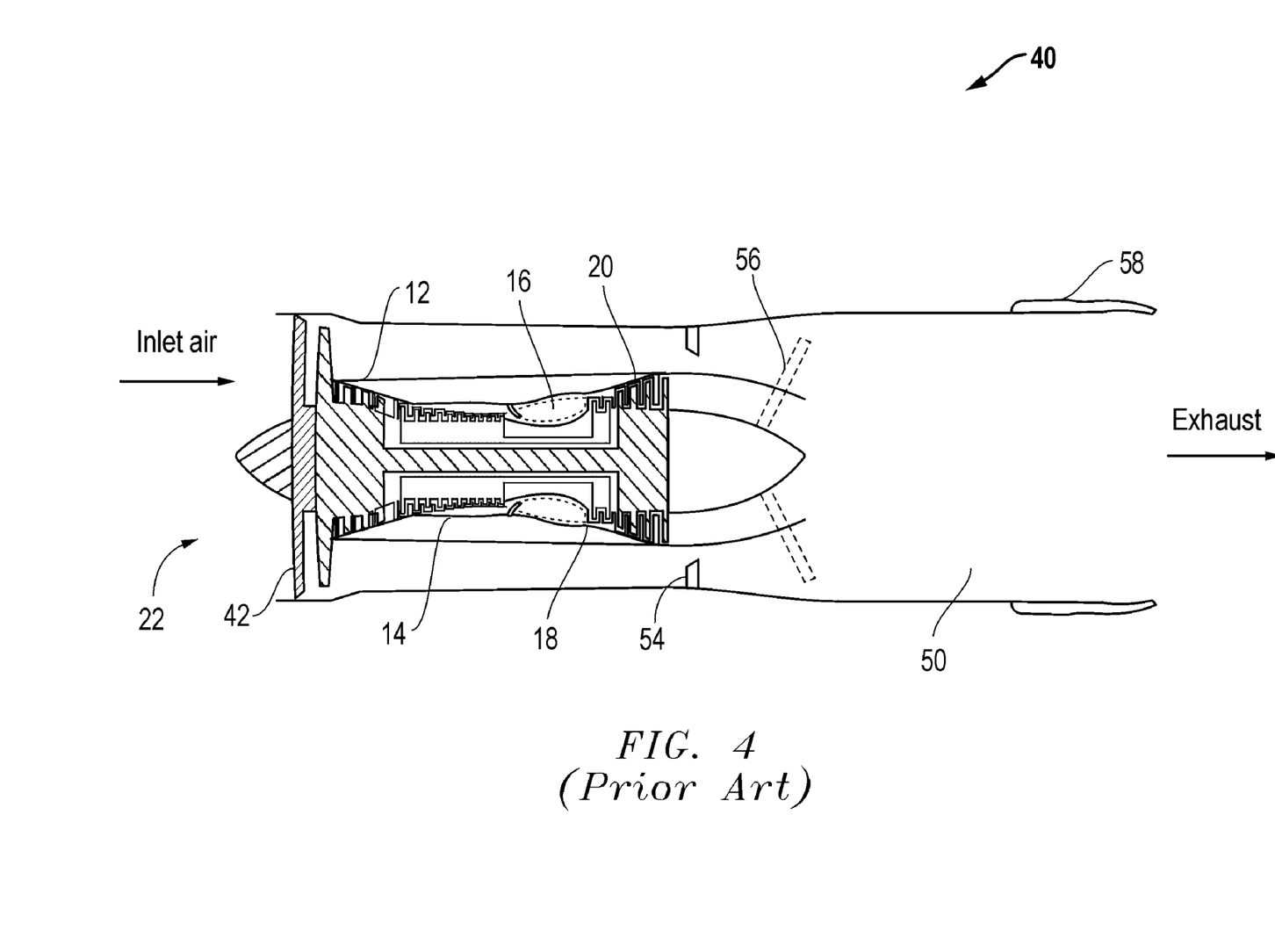
FIG. 4 (Prior Art) is a simplified schematic drawing of the afterburner component attached to the turbofan engine.

In a similar manner as discussed in FIG. 2 for a turbojet engine, an afterburner component 50 may be utilized in the turbofan engine. FIG. 4 is a simplified schematic drawing of the afterburner component for use on the turbofan engine 40. The afterburner component 50 includes an afterburner duct 52 housing an axially aligned plurality of fuel spray bars 54, a plurality of axially aligned flame holders 56 and an adjustable nozzle 58. Afterburning in a turbofan engine typically take place in a mixture of the primary exhaust air and the fan bypass air. Alternative, a duct burning turbofan may be utilized where the fuel spray bars and the flame holders are located in the fan duct and all the afterburning takes place in the bypass air.

For both turbojet and turbofan engines, afterburner operation is feasible because a jet engine operates at a "lean" fuel-to-air ratio to limit temperatures in the hot, rotating parts of the engine to values consistent with high temperature limitations of the materials with which these parts are constructed. Thus, the turbine exhaust provides the excess oxygen necessary for afterburner operation. The afterburner component on a jet engine provides a light and mechanically simple means for achieving a large boost in thrust. However, use of afterburner suffers from significant increase in fuel flow. In addition, drag is increased by the use of the modified jet engine. A jet engine is needed which provides increased thrust upon demand without increasing fuel flow unreasonably. In addition, a jet engine is needed which does not significantly increase drag.

Thus, it would be a distinct advantage to have a jet propulsion system and method which incorporates increased thrust upon demand without adversely increasing drag or utilizing unreasonably increased fuel flow. It is an object of the present invention to provide such a system and method.

SUMMARY OF THE INVENTION

In one aspect, the present invention is a jet propulsion system for use on an aircraft. The jet propulsion system includes a jet engine producing thrust for the aircraft. The jet engine emits an exhaust. A storage tank holds an oxidizing material. In addition, the jet propulsion system includes an afterburner shroud conforming to an outer surface of the jet engine. The oxidizing material is mixed with fuel to form a combustible mixture. The afterburner shroud injects the combustible mixture into the exhaust. The exhaust ignites the mixture, thereby creating an additional thrust for the jet engine.

In another aspect, the present invention is an afterburner shroud for use on a jet engine. The afterburner shroud includes a shroud circumferential shaped and positioned over a portion of the jet engine. An oxidizing material and fuel are mixed to form a combustible mixture. The combustible material is injected into the exhaust created by the jet engine. Upon introduction of the combustible material into the exhaust, the mixture is ignited to provide additional thrust to the jet engine.

In still another aspect, the present invention is a jet propulsion system for use on an aircraft. The jet propulsion system includes a jet engine producing thrust for the aircraft. The jet engine emits an exhaust. The system also includes a storage tank conforming to a portion of an outer surface of the jet engine. The storage tank holds liquid oxygen. An afterburner shroud conforms to an outer surface of the jet engine. The afterburner shroud is affixed by a plurality of moveable support arms. The afterburner shroud is retractable. The afterburner shroud is extended rearward toward the exhaust of the jet engine during operation of the afterburner shroud. A mixing ring is positioned within the afterburner shroud for mixing the liquid oxygen and fuel into a combustible mixture. The afterburner injects the combustible mixture into the exhaust. The exhaust ignites the mixture, thereby creating an additional thrust for the jet engine.

DESCRIPTION OF THE INVENTION

Figure 5:
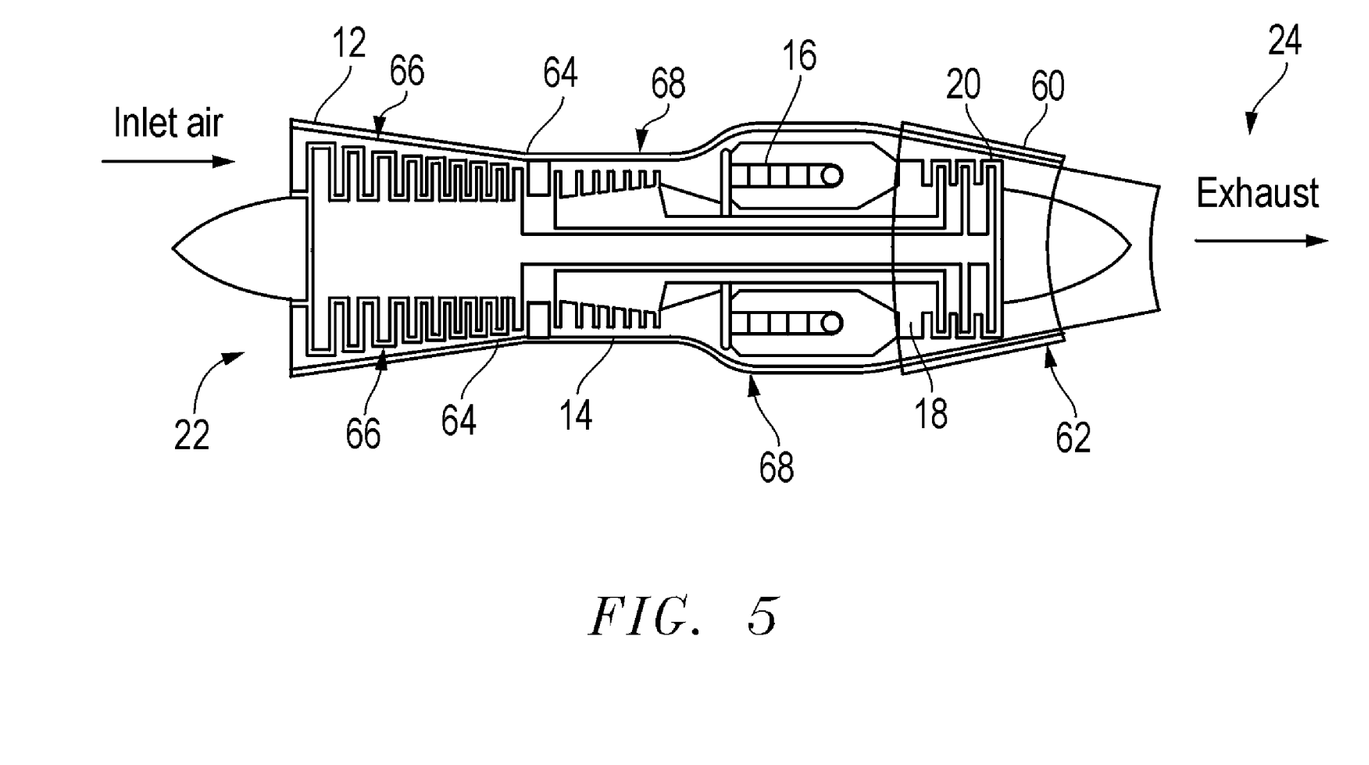
FIG. 5 is a simplified schematic drawing of the turbojet engine with a retractable afterburner shroud in a retracted position in the preferred embodiment of the present invention.

A retractable afterburner shroud is disclosed. FIG. 5 is a simplified schematic drawing of the turbojet engine 10 with a retractable afterburner shroud 60 in a retracted position in the preferred embodiment of the present invention. The afterburner shroud circumferentially covers an outer surface of the turbojet engine. The afterburner shroud, in the retracted position rests against a back portion of the turbojet engine. Preferably, in the retracted position, the afterburner shroud does not extend beyond the end of the exhaust portion 62 of the turbojet. The afterburner shroud, in the retracted position, conforms to the turbojet engine, thereby reducing total drag by the turbojet engine.

Addition, the turbojet engine 10 preferably includes a storage tank 64 conforming to most or the entire outer surface of the turbojet engine. The storage tank may be used to hold liquid oxygen for use with the afterburner shroud 60. The storage tank is preferably constructed from the outer surface 66 of the turbojet engine as an inner wall of the storage tank with an external surface 68 of the storage tank as the outer wall. The storage tank is preferably contoured to the shape of the turbojet engine, thereby reducing drag. However, it should be understood that the storage tank may be located anywhere, either on the engine or separately from the engine.

Figure 6:
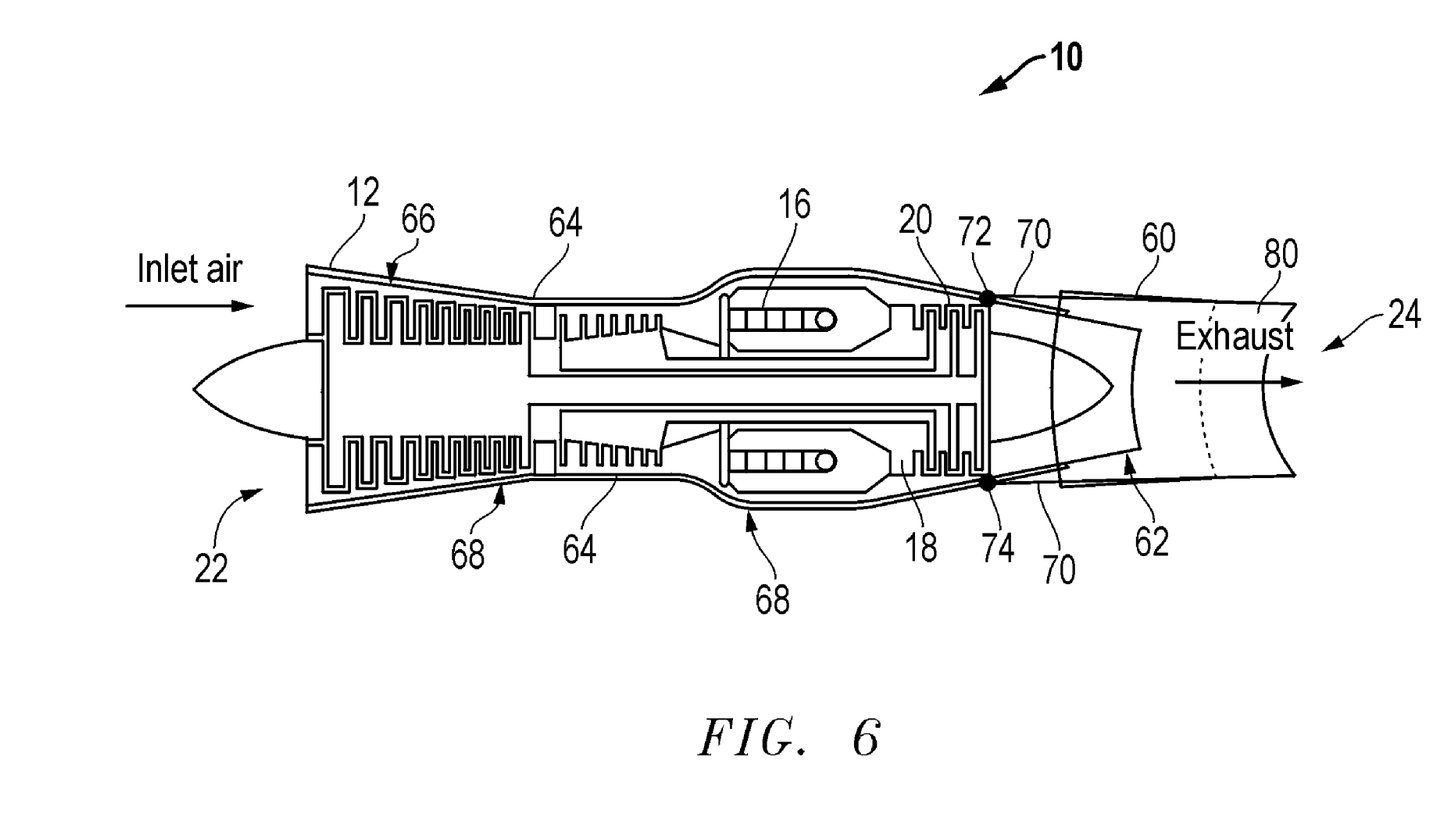
FIG. 6 is a simplified schematic drawing of the turbojet engine with the retractable afterburner shroud in the extended position in the preferred embodiment of the present invention.

FIG. 6 is a simplified schematic drawing of the turbojet engine 10 with the retractable afterburner shroud in the extended position in the preferred embodiment of the present invention. During operation of the afterburner shroud, the afterburner shroud is extended rearward. Preferably, the afterburner shroud is extended beyond the exhaust portion 62 of the turbojet engine. In the preferred embodiment of the present invention, the afterburner shroud still conforms to the shape of the turbojet engine with the shroud extending into the exhaust 24 exiting the turbojet engine. However, preferably, in this extended position, the engine may capture or "pull" additional air form the flow along a cowling portion of the engine to add to the exhaust. The exhaust, it should be noted, exits the turbojet engine at a very hot temperature (which varies in magnitude of heat by the type and size of the jet propulsion system). It should be understood, that, in alternate embodiments, the positioning of the afterburner shroud may be anywhere on the jet engine.

The afterburner shroud may be extended rearward by a plurality of support arms 70. In the preferred embodiment of the present invention, three or four support arms are utilized. The support arms are affixed to both the turbojet engine 10 and the afterburner shroud. The support arms provide support to hold the afterburner shroud in both the retracted and extended position. Additionally, the support arms may provide a conduit for feeding liquid oxygen from the storage tank 64 into the exhaust 24. In addition, the support arms may also feed fuel or an oxygen/fuel mixture to the exhaust. Due to the severe loads placed on the support arms, the support arms must be constructed of a strong material. One such material which may be utilized is an amorphous metal alloy such as that which has been developed by Liquidmetal® Technologies. The metal alloy provides unique characteristics which would be critical in utilizing the support arms. The support arms, constructed from the amorphous metal alloys would have high yield strength, high harness, superior strength/weight ratio, superior elastic limits, and high corrosion resistance.

In the preferred embodiment of the present invention, the support arms 70 pivot away from the outer surface 66 of the turbojet (about pivot points 72 and 74) as well as rearward toward the exhaust 24 of the turbojet engine while extending the afterburner shroud 60 to its operational position.

Figure 7:
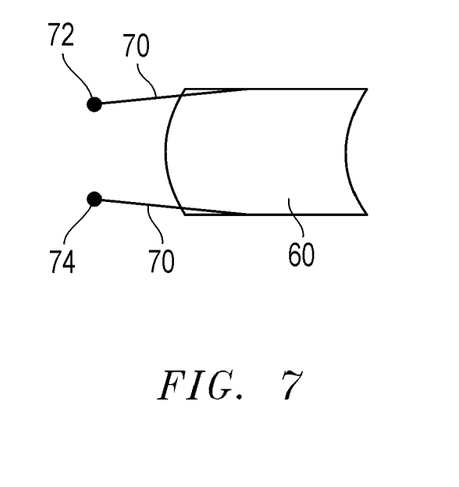
FIG. 7 is a side view of the afterburner shroud removed from the turbojet engine.
Figure 8:
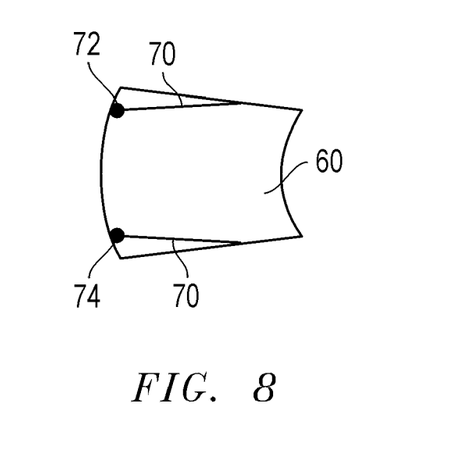
FIG. 8 is a side view of the afterburner shroud removed from the turbojet engine with the support arms in the retracted position.

FIG. 7 is a side view of the afterburner shroud 60 removed from the turbojet engine 10. As depicted in FIG. 7, the support arms 70 are extended out (for the extended position of the afterburner shroud). FIG. 8 is a side view of the afterburner shroud 60 removed from the turbojet engine with the support arms 70 in the retracted position.

Figure 9:
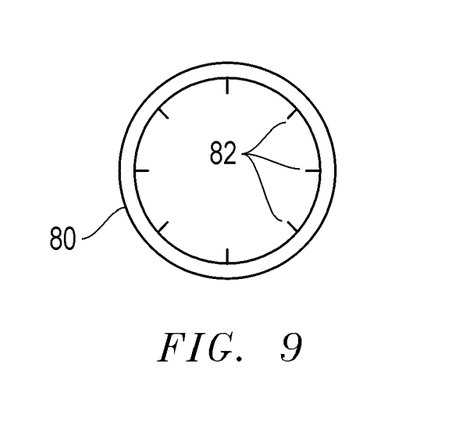
FIG. 9 is a rear plan form view of the afterburner shroud removed from the turbojet engine.

FIG. 9 is a rear plan form view of the afterburner shroud 70 removed from the turbojet engine 10. Within the afterburner shroud is preferably a mixing ring 80 having a plurality of circumferentially aligned injectors 82. The mixing ring provides a mixture of fuel and liquid oxygen for introduction through the injectors 82 to the exhaust. The mixing ring enables the proper mixture of fuel and liquid oxygen for additional thrust. The mixture of liquid oxygen to fuel is preferably within the range of 1 to 3 or 1 to 4. However, any mixture of fuel and liquid oxygen may be introduced into the exhaust. The fuel/liquid oxygen mixture is introduced into the exhaust. Due to the extreme heat of the exhaust, the mixture is ignited. The ignited mixture provides an additional thrust to the turbojet engine.

With reference to FIGS. 5-9, the operation of the afterburner shroud will now be explained. Without need of additional thrust from the afterburner shroud 60, the afterburner shroud is stowed in the retracted position (FIG. 5). The afterburner shroud is contoured to the outer surface 66 of the turbojet engine. The support arms are locked into the retracted position about the pivot points 72 and 74. The support arms may be locked by a locking mechanism or electromechanical mechanism. Alternatively, the support arms may be locked in place by pneumatics provided from bleed air provided by the turbojet engine. Still in another embodiment, the support arms may be locked by the utilization or withholding of hydraulic pressure. In the retracted position, the afterburner shroud conforms in such a manner to the turbojet engine that drag is minimized. In existing afterburner engines, the afterburner suffers from the disadvantage of always being in an extended position, which causes increased drag. The storage tank may be filled with a liquid oxygen composition. The liquid oxygen is stored in such a manner as to reduce drag upon the engine. However, in alternate embodiments of the present invention, the liquid oxygen is stored in a holding storage facility located near or on the engine.

Liquid oxygen is preferably utilized by the afterburner shroud to provide an oxidizing source for mixture to fuel, which is injected into the exhaust 24. However, any oxygen mixture, either in gaseous or liquid form may be utilized. For example, a liquid mixture composed of a high concentration of oxygen as well as other chemicals may be utilized.

When desired, additional thrust may be obtained from the afterburner shroud 60. When operation of the afterburner shroud is desired, the afterburner shroud is extended rearward. Preferably, in the extended position (FIG. 6), the afterburner shroud extends beyond the exhaust portion of the turbojet engine 10. The afterburner shroud is extended rearward by the pivoting movement of the support arms 70. The support arms preferably pivot. However, in alternate embodiments of the present invention, the support arms may articulate or slide outwardly in a fashion allowing the shroud to extend rearward. The support arms may be actuated in a variety of ways. For example, the pivot arms may be electro-mechanically, hydraulically or pneumatically actuated. The support arms provide the dual function of supporting the afterburner shroud and providing a conduit of the liquid oxygen and fuel to the mixing ring 80.

With the afterburner shroud 60 in the extended position, the mixing rings meter appropriate amounts of liquid oxygen/fuel through the injectors into the exhaust 24. The liquid oxygen is supplied from the storage tank 64 while the fuel may be supplied through the engine from the aircraft. Upon introduction of the liquid oxygen/fuel mixture to the exhaust, due to the high temperature of the exhaust, the mixture is ignited. With the mixture being ignited, thrust is created, thereby propelling the turbojet engine and the aircraft. Since liquid oxygen is introduced into the injected fuel, a more efficient fuel burn is achieved while still providing a significant increase in thrust. In addition, conventional afterburners are limited in their performance by the amount of air captured through the inlet of the jet engine. The present invention is not limited by the quantity of air passing through the inlet. As compared to conventional afterburners, the present invention provides a significantly reduced use of fuel during operation of the afterburner shroud.

When operation of the afterburner shroud 60 is no longer desired, the afterburner shroud is retracted to the stowed position. As discussed above, while in a retracted position, drag is reduced. Retraction and extension of the afterburner shroud 60 may be actuated by a detent located on the throttle quadrant as is common in aircraft having afterburner. Alternatively, the control of the position of the afterburner shroud may be by any manual or automatic system.

Figure 10:
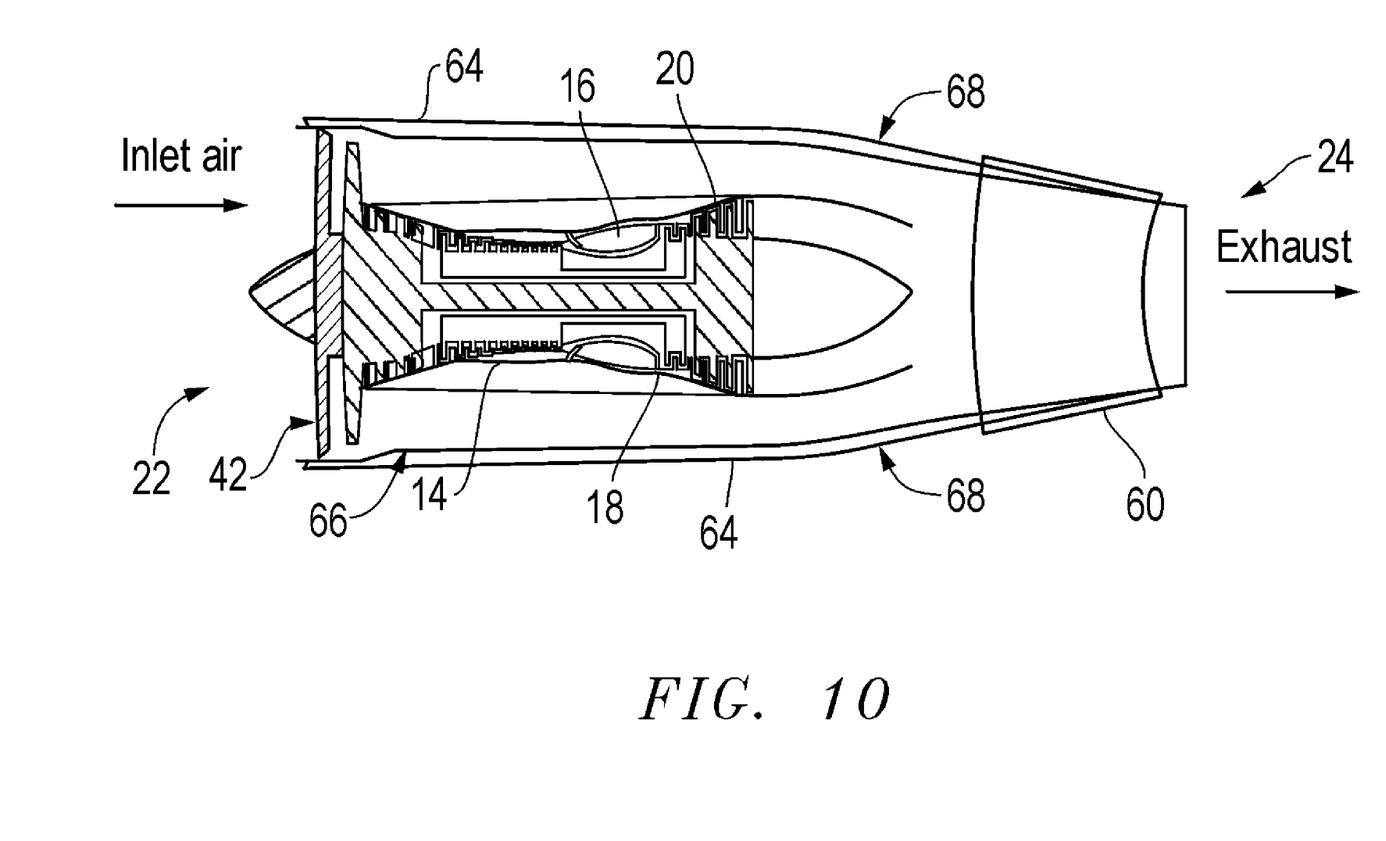
FIG. 10 is a simplified schematic drawing of the turbofan engine with a retractable afterburner shroud in a retracted position in an alternate embodiment of the present invention.

The afterburner shroud may also be employed on any type of jet propulsion system, such as the turbofan engine 40. FIG. 10 is a simplified schematic drawing of the turbofan engine 40 with a retractable afterburner shroud 60 in a retracted position in an alternate embodiment of the present invention. The afterburner shroud circumferentially covers an outer surface of the turbofan engine. The afterburner shroud, in the retracted position, rests against a back portion of the turbofan engine without extending beyond the end of the exhaust portion 62 of the turbofan. The afterburner shroud, in the retracted position, conforms to the turbofan engine, thereby reducing total drag by the turbofan engine.

Additionally, the turbofan engine 40 preferably includes a storage tank 64 conforming to most or the entire outer surface of the turbofan engine. The storage tank may be used to hold liquid oxygen for use by the afterburner shroud 60. The storage tank is constructed from the outer surface 66 of the turbofan engine as an inner wall of the storage tank with an external surface 68 of the storage tank as the outer wall. The storage tank is preferably contoured to the shape of the turbofan engine, thereby reducing drag.

Figure 11:
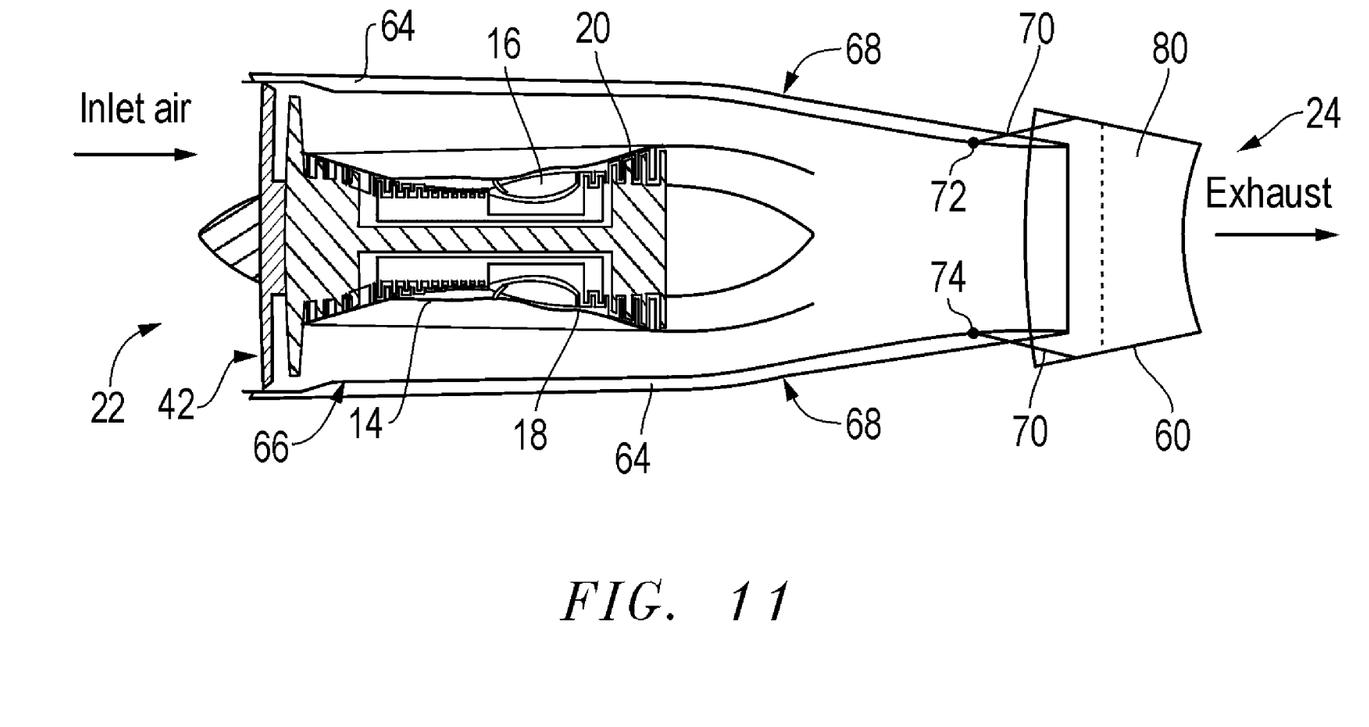
FIG. 11 is a simplified schematic drawing of the turbofan engine with the retractable afterburner shroud in the extended position in an alternate embodiment of the present invention.

FIG. 11 is a simplified schematic drawing of the turbofan engine 40 with the retractable afterburner shroud in the extended position in an alternate embodiment of the present invention. During operation of the afterburner shroud, the afterburner shroud is extended rearward. Preferably, the afterburner shroud is extended beyond the exhaust portion 62 of the turbofan engine. Preferably, the afterburner shroud still conforms to the shape of the turbofan engine with the shroud extending into the exhaust 24 exiting the turbofan engine. The exhaust exits the turbofan engine at a very hot temperature in a similar fashion as the exhaust exiting a turbojet engine.

The afterburner shroud may be extended rearward by a plurality of support arms 70. The support arms are affixed to both the turbofan engine 40 and the afterburner shroud. The support arms provide support to hold the afterburner shroud in both the retracted and extended position. Additionally, the support arms may provide a conduit for feeding liquid oxygen from the storage tank 64 into the exhaust 24. In addition, the support arms may also feed fuel or a liquid oxygen/fuel mixture to the exhaust. The support arms should be constructed of a strong material, such as an amorphous metal alloy.

Preferably, the support arms 70 pivot away from the outer surface 66 of the turbofan (about pivot points 72 and 74) as well as rearward toward the exhaust 24 of the turbofan engine while extending the afterburner shroud 60 to its operation position.

With reference to FIGS. 7-11, the operation of the afterburner shroud will now be explained. Without the need of additional thrust from the afterburner shroud 60, the afterburner shroud is stowed in the retracted position (FIG. 10). The afterburner shroud is contoured to the outer surface 66 of the turbofan engine. The support arms are locked into the retracted position about the pivot points 72 and 74. The support arms may be locked by a locking mechanical or electromechanical mechanism. Alternatively, the support arms may be locked in place by pneumatics provided by bleed air from the turbofan engine. Still in another embodiment, the support arms may be locked by the utilization or withholding of hydraulic pressure. In the retracted position, the afterburner shroud conforms in such a manner to the turbofan engine that drag is minimized. The storage tank may be filled with a liquid oxygen composition. The liquid oxygen is stored in such a manner as to reduce drag upon the engine. However, in alternate embodiments of the present invention, the liquid oxygen is stored in a holding storage facility located near or on the engine.

Liquid oxygen is preferably utilized by the afterburner shroud to provide an oxidizing source for mixture to fuel which is injected into the exhaust 24. However, any oxygen mixture, either in gaseous or liquid form may be utilized. For example, a liquid mixture composed of a high concentration of oxygen as well as other chemicals may be utilized.

When desired, additional thrust may be obtained by the afterburner shroud 60. When operation of the afterburner shroud is desired, the afterburner shroud is extended rearward. Preferably, in the extended position (FIG. 11), the afterburner shroud extends beyond the exhaust portion of the turbojet engine 40. The afterburner shroud is extended forward by the pivoting movement of the support arms 70. The support arms preferably pivot. However, in alternate embodiments of the present invention, the support arms may articulate or slide outwardly in a fashion allowing the shroud to extend rearward. The support arms may be actuated in a variety of ways. For example, the pivot arms may be electro-mechanically, hydraulically or pneumatically actuated. The support arms provide the dual function of supporting the afterburner shroud and providing a conduit of the liquid oxygen and fuel to the mixing ring 80.

With the afterburner shroud 60 in the extended position, the mixing rings meter appropriate amounts of liquid oxygen/fuel through the injectors into the exhaust 24. The liquid oxygen is supplied from the storage tank 64 while the fuel may be supplied through the engine from the aircraft. Upon introduction of the liquid oxygen/fuel mixture to the exhaust, due to the high temperature of the exhaust, the mixture is ignited. With the mixture being ignited, thrust is created, thereby propelling the turbofan engine and the aircraft. Since liquid oxygen is introduced into the injected fuel, a more efficient burn is achieved while still providing a significant increase in thrust. As compared to conventional afterburners, the present invention provides significant thrust and reduced fuel rates. When operation of the afterburner shroud is no longer desired, the afterburner shroud is retracted to the stowed position. As discussed above, while in a retracted position, drag is reduced.

In alternate embodiments of the present invention, rather than utilizing support arms to extend the shroud, the shroud may be telescopically attached to the end portion of the engine. Thus, in operation, the shroud is telescopically extended rearward, thereby extending the over length of the jet engine. In addition, to assist in igniting the exhaust, igniters may be utilized on or near the shroud or rear portion of the jet engine to ignite the exhaust and mixture.

The present invention may be utilized on any type of flying vehicle, such as an aircraft, missile or other unmanned or manned flying vehicle. Although the preferred embodiment of the present invention utilizes a retractable afterburner shroud, the afterburner shroud may be locked in the extended position during all phases of flight. For the retractable afterburner shroud, any mechanism may be utilized to slide the afterburner shroud forward and rearward.

The present invention provides many advantages over existing afterburner systems. Unlike existing afterburner systems, the present invention provides an efficient way of metering fuel in combination with liquid oxygen to the engine exhaust to produce a significant increase in thrust. In addition, the afterburner shroud is retractable to reduce drag when not in use. The present invention also enables the efficient, space-saving capability of storing liquid oxygen in a storage tank contoured to the propulsion system. The present invention may also be retrofitted to existing jet propulsion systems.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A jet propulsion system for use on an aircraft, said jet propulsion system comprising:
   a jet engine producing thrust for the aircraft, said jet engine emitting an exhaust;
   a storage tank holding an oxidizing material; and
   an afterburner shroud conforming to an outer surface of said jet engine, wherein said afterburner shroud is retractable from a forward position when not in use to a rearward position during use of said afterburner shroud; and
   means for mixing the oxidizing material and fuel into a combustible mixture;
   said afterburner shroud injecting the combustible mixture into the exhaust, whereby the exhaust ignites the mixture, thereby creating an additional thrust for said jet engine.

2. The jet propulsion system of claim 1, wherein said jet engine is a turbojet engine.

3. The jet propulsion system of claim 1, wherein said jet engine is a turbofan engine.

4. The jet propulsion system of claim 1 wherein the oxidizing material is liquid oxygen.

5. The jet propulsion system of claim 1 wherein said afterburner shroud extends beyond an exhaust end of the jet engine during operation of the afterburner shroud.

6. The jet propulsion system of claim 1 wherein said afterburner shroud is attached to said jet engine by a plurality of moveable support arms.

7. The jet propulsion system of claim 6 wherein the support arms are pivotable.

8. The jet propulsion system of claim 6 wherein the support arms are conduits providing passage of the oxidizing material and fuel to said afterburner shroud.

9. The jet propulsion system of claim 1 wherein said means for mixing is a mixing ring circumferentially aligned within said afterburner shroud.

10. The jet propulsion system of claim 9 wherein the mixing ring includes a plurality of injectors for injecting fuel and the oxidizing material into the exhaust of said jet engine.

11. The jet propulsion system of claim 9 wherein:
    said afterburner shroud is affixed to said jet engine by a plurality of support arms; and
    the plurality of support arms feed fuel and the oxidizing material to the mixing ring.

12. The jet propulsion system of claim 1 wherein the storage tank conforms to at least a portion of an outer surface of the jet engine.

13. An afterburner shroud for use on a jet engine, said afterburner shroud comprising:
    a shroud circumferential shaped and positioned over a portion of the jet engine;
    means for mixing an oxidizing material and fuel to form a combustible material, wherein said shroud is affixed to a portion of an outer surface of the jet engine by a plurality of support arms; and
    injecting means for injecting the combustible material into the exhaust created by the jet engine;
    whereby the combustible material is ignited by the exhaust and provides an additional thrust to the jet engine.

14. The afterburner shroud of claim 13 wherein the shroud is retractable and the support arms move to extend the shroud rearward toward the exhaust during operation of the afterburner shroud.

15. The afterburner shroud of claim 13 wherein the mixing means is a mixing ring circumferentially aligned within the shroud.

16. The afterburner shroud of claim 15 wherein the injecting means is a plurality of injectors attached to the mixing ring.

17. The afterburner shroud of claim 13 wherein the oxidizing material is liquid oxygen.

18. A jet propulsion system for use on an aircraft, said jet propulsion system comprising:
    a jet engine producing thrust for the aircraft, the jet engine emitting an exhaust;
    a storage tank conforming to a portion of an outer surface of said jet engine, said storage tank holding liquid oxygen;
    an afterburner shroud conforming to an outer surface of said jet engine, said afterburner shroud being affixed by a plurality of moveable support arms and wherein said afterburner shroud is retractable, said afterburner shroud being extended rearward toward the exhaust of the jet engine during operation of the afterburner shroud; and
    a mixing ring positioned within said afterburner shroud for mixing the liquid oxygen and fuel into a combustible mixture;
    said afterburner injecting the combustible mixture into the exhaust, whereby the exhaust ignites the mixture, thereby creating an additional thrust for said jet engine.

* * * * *

UNITED STATES PATENT AND TRADEMARK OFFICE
CERTIFICATE OF CORRECTION

PATENT NO. : 7,334,409 B2
APPLICATION NO. : 10/848986
DATED : February 26, 2008
INVENTOR(S) : Donal S. Dunbar It is certified that error appears in the above-identified patent and that said Letters Patent is hereby corrected as shown below:

On the title page item (73), for the assignee name "Alltech, Inc." should read -Adtech, Inc.-.

Signed and Sealed this
Twentieth Day of May, 2014

Michelle K. Lee
*Deputy Director of the United States Patent and Trademark Office*